No. 615,148. Patented Nov. 29, 1898.
R. B. U. H. J. DUNCAN.
ROLLER BEARING WHEEL.
(Application filed Mar. 22, 1897.)
(No Model.)
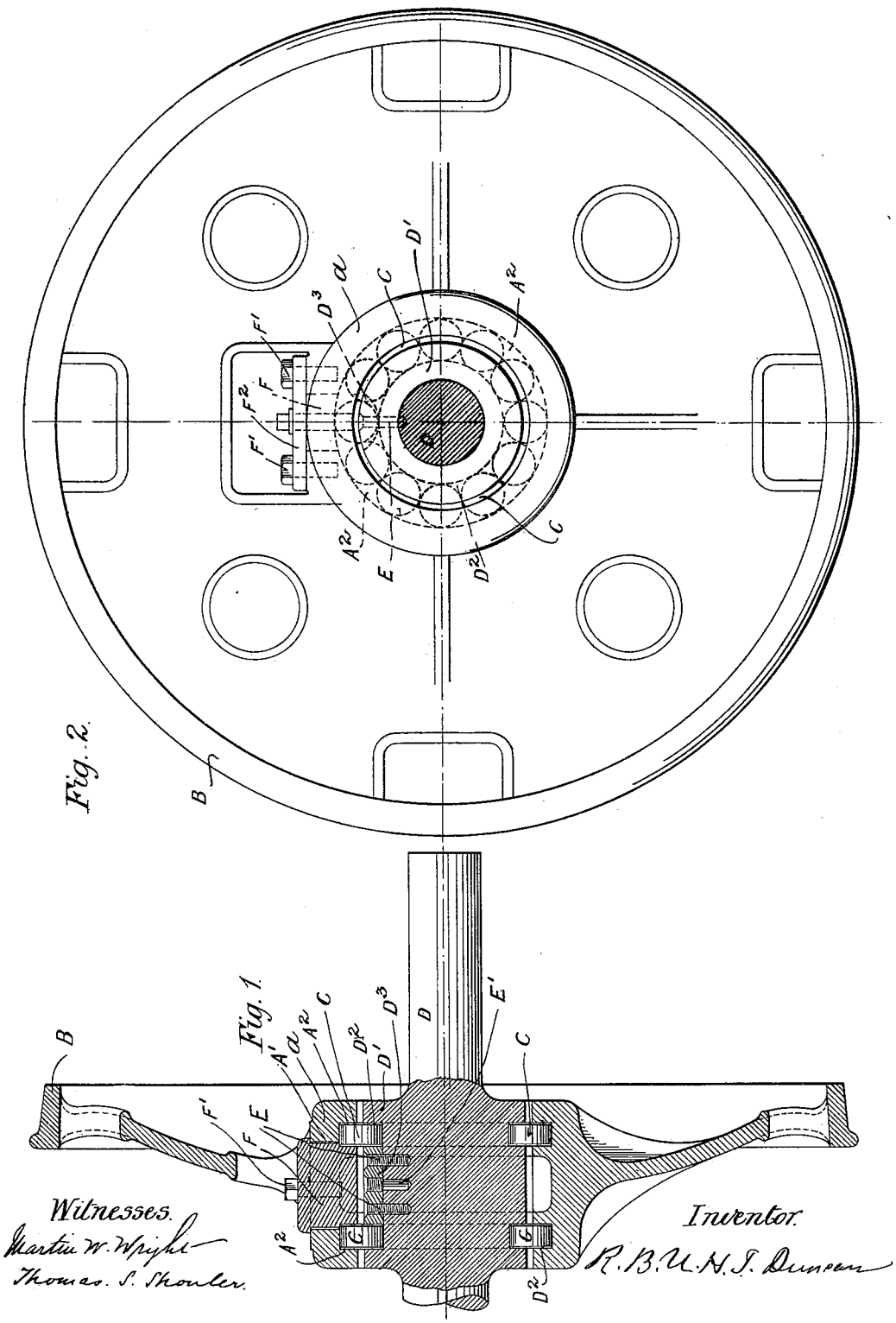

UNITED STATES PATENT OFFICE.

ROBERT B. U. H. J. DUNCAN, OF LEICESTER, ENGLAND.

ROLLER-BEARING WHEEL.

SPECIFICATION forming part of Letters Patent No. 615,148, dated November 29, 1898.

Application filed March 22, 1897. Serial No. 628,715. (No model.)

*To all whom it may concern:*

Be it known that I, ROBERT BARCLAY URY HENERKY JOHN DUNCAN, a subject of the Queen of England, and a resident of Leicester, in the county of Leicester, England, have invented certain new and useful Improvements in Pulley-Bearings for Wheels of Vehicles, Ships' Blocks, and for other Purposes, of which the following is a specification.

This invention relates to improvements in wheels of vehicles, whereby the friction is considerably lessened and the wear and tear consequent thereon reduced.

According to my invention I form the wheel in parts so arranged that a series of rollers are located in grooves formed in the central hollow portion or hub of the outer annular ring or running part of the wheel and the enlarged part of the axle, the latter being grooved coincidentally with the hub, the rollers being free to revolve and materially reducing the friction between the hub and axle.

In order that my invention may be clearly understood, I will now proceed to describe the same with reference to the accompanying drawings, in which—

Figure 1 is a vertical section, and Fig. 2 a side elevation, of a tram-car or railway-carriage wheel or the like.

The central hollow portion or hub $a$ is formed integrally with the annular ring B, and the rollers C are interposed between the said hub $a$ and the enlarged part D' of the axle D. To enable the rollers C to be placed in position in the grooves $A^2$ of the hub $a$ and $D^2$ of the axle, the said grooves coinciding, an opening A' is provided in the hub $a$ and a portion $D^3$ of the enlarged part D' of the axle D is made removable, as clearly shown in Fig. 1. After removal of the part $D^3$ the rollers C may be passed through the opening A' and slid along into the coincident grooves $A^2$ $D^2$ before mentioned. After all the rollers have been placed in position the removable part $D^3$ is placed on the axle and secured in position by the screws E E and steady-peg E'.

The opening A', formed in the hub A, is closed by inserting therein a flanged block F, which is retained in position by the screws F', passing through the flange $F^2$.

It will be understood that it is essential that the enlarged part D' of the axle D must be slightly less in diameter than the inner face of the hub $a$, so that all the weight is borne by the rollers C.

What I claim is—

A wheel comprising a central hollow portion having grooves, an axle having an enlarged portion which is grooved coincidentally with the part of the wheel in which it fits, rollers in said grooves, the hub of the wheel having a cut-away portion and the axle a cut-away portion adapted for convenience in placing the rollers in position, and parts adapted to be received in said cut-away portions of the hub and axle and to be removed therefrom.

In testimony whereof I have signed my name to this specification in the presence of two subscribing witnesses.

ROBT. B. U. H. J. DUNCAN.

Witnesses:
 MARTIN W. WRIGHT,
 THOMAS S. SHOULER.